(12) United States Patent
Mazzacano et al.

(10) Patent No.: US 7,862,276 B2
(45) Date of Patent: Jan. 4, 2011

(54) ANTI-UNSCREWING DEVICE FOR RING NUTS IN COUPLING SYSTEMS FOR TUBES

(75) Inventors: Corrado Mazzacano, Casella (IT); Andrea Bisio, Casella (IT)

(73) Assignees: F.I.P. Formatura Iniezione Polimeri S.p.A., Casella (Genova) (IT); Aliaxis R & D, Vernouillet (FR)

(*) Notice: Subject to any disclaimer, the term of this patent is extended or adjusted under 35 U.S.C. 154(b) by 669 days.

(21) Appl. No.: 11/299,749

(22) Filed: Dec. 13, 2005

(65) Prior Publication Data
US 2006/0165508 A1 Jul. 27, 2006

(30) Foreign Application Priority Data
Jan. 27, 2005 (EP) ................... 05425033

(51) Int. Cl.
*F16B 39/02* (2006.01)
*F16B 39/32* (2006.01)
*F16B 39/282* (2006.01)

(52) U.S. Cl. .................... 411/89; 411/102; 411/114; 411/326; 411/978; 411/145

(58) Field of Classification Search ............ 411/89, 411/102, 98, 114, 115, 326, 145, 978
See application file for complete search history.

(56) References Cited

U.S. PATENT DOCUMENTS 5,083,819 A * 1/1992 Bynum .................. 285/89
5,362,110 A * 11/1994 Bynum .................. 285/87
5,388,866 A * 2/1995 Schlosser ................ 285/92
5,823,702 A * 10/1998 Bynum .................. 403/320
6,679,663 B2 * 1/2004 DiStasio et al. ........... 411/329

FOREIGN PATENT DOCUMENTS

| EP | 0 945 664 A | 9/1999 |
|---|---|---|
| EP | 1 452 789 A | 9/2004 |

OTHER PUBLICATIONS

European Search Report dated Jul. 4, 2005 for European Application No. 05 42 5033.

* cited by examiner

*Primary Examiner*—David Reese
(74) *Attorney, Agent, or Firm*—Hogan Lovells US LLP

(57) ABSTRACT

An anti-unscrewing device for coupling the tubular ends of two components in fluid conveying or delivery systems by means of a threaded ring nut that can be screwed to one of said tubular ends to connect said ends, wherein said anti-unscrewing device comprises a connecting portion to connect the device to one of the components and at least one counter element provided with an engaging portion suitable to engage a corresponding engaging surface formed at said ring nut, such that the engaging portion can be displaced by means of a movement of the ring nut. There are further provided guide means dictating a movement path for the counter element, such that an unscrewing movement of the ring nut will cause the engaging portion to move to a locking position relative to the ring nut thereby preventing the ring nut from unscrewing.

15 Claims, 4 Drawing Sheets

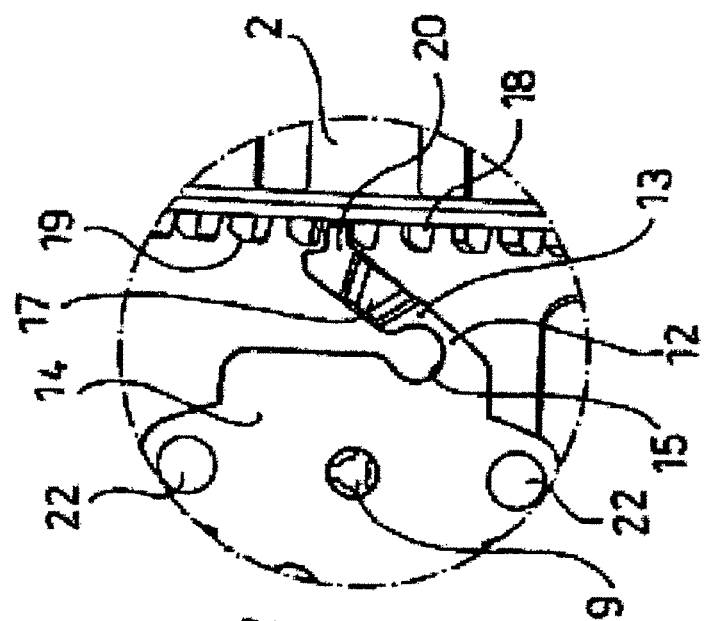
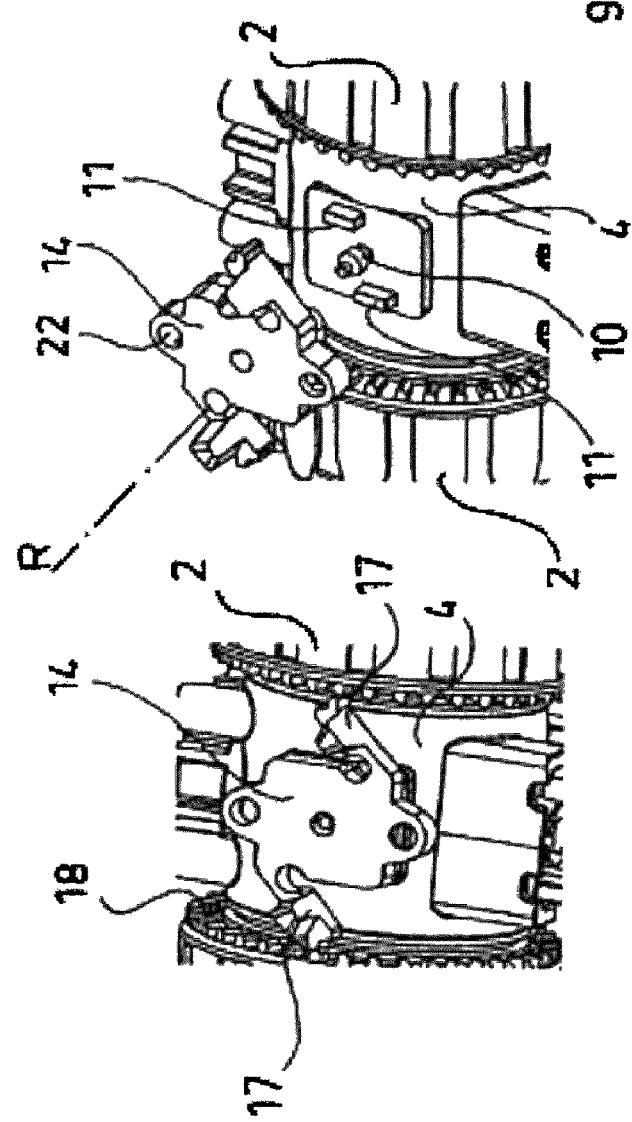

US 7,862,276 B2

ANTI-UNSCREWING DEVICE FOR RING NUTS IN COUPLING SYSTEMS FOR TUBES

BACKGROUND OF THE INVENTION

The present invention relates to an anti-unscrewing device for ring nuts in coupling systems for tubes, particularly for ring nuts connecting tubes to valves or similar components, for example in fluid conveying and delivery systems.

In order to optimize and economize the production of fluid conveying and delivery systems, such as hydraulic circuits provided with tubing and valves of different nature, such as distribution valves, control valves, drain valves, damping valves, delivery valves or selector valves, the valves are usually manufactured separately from the tubes and connected thereto only upon assembling the hydraulic circuit.

Upon assembling a hydraulic circuit, for example, the valves and tubes are connected to each other such as to ensure that the desired functions will be carried out.

To the purpose, the valve usually comprises an externally threaded coupling portion and a ring nut with inner threading that is suitable to be screwed on the coupling portion to hold an end of a tube into engagement with this coupling portion.

This type of connection is easy to assemble, though it suffers from the drawback that the connection becomes undesirably loosened, due to the generally limited travel of the threading on the one hand, and on the other hand to the mechanical stress caused by pressure changes, vibrations and water hammering in the fluid circuit, as well as the operation of the valves, which is typically of a mechanical or electro-magnetic type, and is often cyclical.

Accordingly, the object of the present invention is to provide an anti-unscrewing device for ring nuts in coupling systems for tubes, having such characteristics to overcome the drawbacks mentioned with reference to the prior art.

SUMMARY OF THE INVENTION

This object is achieved by means of an anti-unscrewing device for ring nuts joining tubular ends of two components in fluid conveying or delivery systems, wherein the ring nut can be screwed to one of the tubular ends in order to join said ends, wherein said anti-unscrewing device comprises:
  a connecting portion connecting the device to one of the components;
  at least one counter element provided with an engaging portion suitable to engage a corresponding engaging surface formed at said ring nut, such that the engaging portion can be displaced by a movement of the ring nut;
  guide means dictating a movement path for the counter element, such that an unscrewing movement of the ring nut will cause the engaging portion to move to a locking position relative to the ring nut thereby preventing the ring nut from unscrewing.

This object is also achieved by means of an anti-unscrewing device for ring nuts joining tubular ends of two components in fluid conveying or delivery systems, wherein the ring nut can be screwed to one of the tubular ends in order to join said ends, wherein said anti-unscrewing device comprises:
  a connecting portion connecting the device to the ring nut;
  at least one counter element provided with an engaging portion suitable to engage a corresponding engaging surface formed at a component of said components, such that the engaging portion can be displaced by a movement of the ring nut;
  guide means dictating a movement path for the counter element, such that an unscrewing movement of the ring nut will cause the engaging portion to move to a locking position relative to the ring nut thereby preventing the ring nut from unscrewing.

In order to better understand the present invention and appreciate the advantages of the same, some exemplary embodiments thereof will be described below, with reference to the annexed figures, in which:

BRIEF DESCRIPTION OF THE DRAWINGS

FIG. 4 is an enlarged view of a detail of the device according to the invention;

FIGS. 5 and 6 are perspective views illustrating the assembly of the device according to the invention.

DETAILED DESCRIPTION OF THE INVENTION

Figure 1:
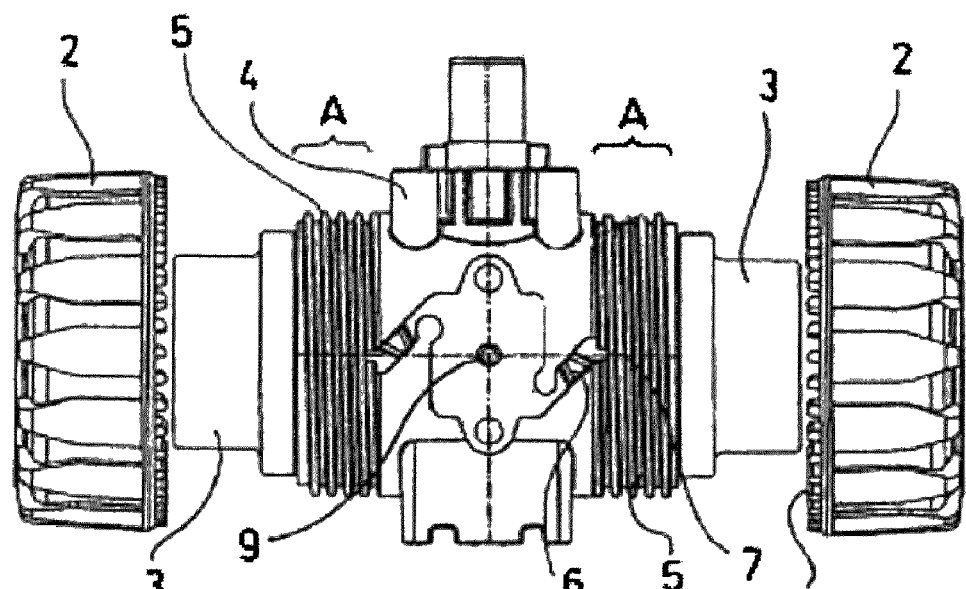
FIG. 1 is a side view of an embodiment of the anti-unscrewing device according to the invention in a first configuration of use.
Figure 2:
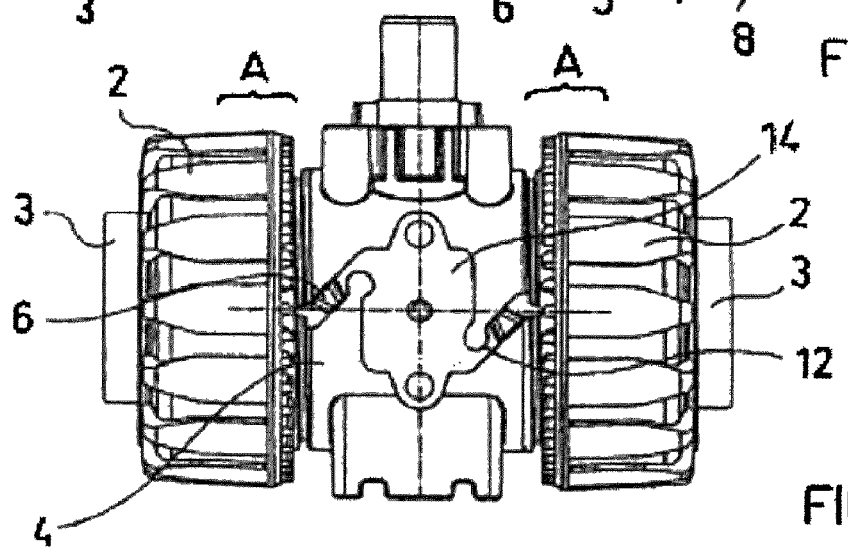
FIG. 2 is a side view of the anti-unscrewing device from FIG. 1 in a second configuration of use.
Figure 3:
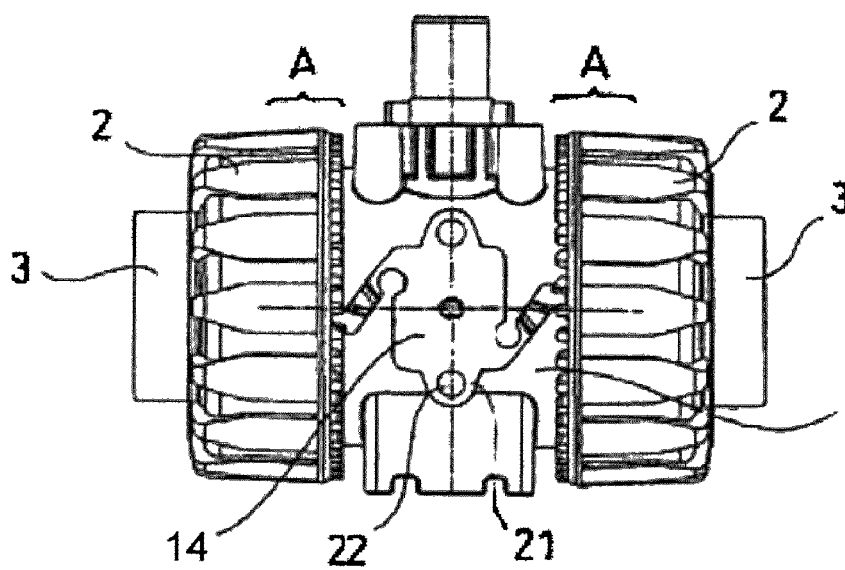
FIG. 3 is a side view of the anti-unscrewing device from FIG. 1 in a third configuration of use.

With reference to the figures, an anti-unscrewing device is generally designated with reference 1. The anti-unscrewing device 1 is destined to lock the connection, which is provided by means of a threaded ring nut 2, of the tubular ends of two components, for example a tube 3 and a valve 4, in fluid conveying or delivery systems.

The ring nut 2 is either associated or can be associated to the tubular end of one of the components, for example of tube 3, and can be screwed to the tubular end of the other component, for example to a threaded portion 5 of the valve 4, to put said valve 4 and said tube 3 in fluid communication to each other.

The anti-unscrewing device 1 is either connectable or connected to the outer surface of the valve 4 and comprises at least one counter element 6 provided with an engaging portion 7. The engaging portion 7 is suitable to engage a corresponding engaging surface 8 of the ring nut 2, such that the engaging portion 7 can be moved by means of a movement of the ring nut 2.

The device 1 further comprises guide means 12, 16 dictating a movement path for the counter element 6, such that an unscrewing movement of the ring nut 2 will cause the engaging portion 7 to move to a locking position relative to the ring nut 2 thereby preventing the ring nut 2 from unscrewing.

Particularly, guide means dictate a movement path for the counter element 6, such that when the ring nut is in an advanced screwing area A, the engaging portion 7 will engage the engaging surface 8 of the ring nut 2 and the movement of the engaging portion 7, which is caused by an unscrewing movement of the ring nut, will be incompatible with and/or opposite to the movement of the engaging surface 8.

Due to the movements of the engaging surface 8 and the engaging portion 7 being incompatible with each other, the latter will automatically prevent the ring nut 2 from unscrewing.

In accordance with an embodiment, the device 1 comprises a connecting portion, for example a plate 14 defining a seat 9 for (preferably snap-) housing a corresponding (preferably mushroom-shaped) pin 10 projecting from the outer surface of valve 4. Advantageously, the seat 9 and/or pin 10 can be yieldingly deformed, in the sense of elastic widening of the seat 9 and/or elastic compressibility of the pin 10 such as to provide said snap connection ensuring the connection of the device 1 with the component, i.e. the valve 4.

On the side of plate 14 facing the valve 4, there are further formed two secondary seats (not shown in the figures) which are spaced apart from each other and suitable to house corresponding blocks 11 spaced apart from each other that are formed on the outer surface of the valve 4 (see FIG. 5). The secondary seats and the blocks 11 are arranged relative to the seat 9 and pin 10 such that when the pin 10 engages the seat 9 of the device 1, each of blocks 11 is inserted in one of the secondary seats to provide a rotary integral connection between the device 1 and valve 4.

Advantageously, said guide means comprise an articulating portion 12 defining a rotation and/or inclination and/or flexion axis R of the counter element 6, which axis R (FIG. 5) is preferably arranged (relative to the engaging surface 8) such that, when the ring nut 2 is in the advanced screwing area A, an unscrewing movement of ring nut 2 will cause the counter element 6 to rotate substantially about the axis R such as to displace the engaging portion 7 (in the unscrewing direction of the ring nut) against the engaging surface 8 with a speed higher than the speed at which the engaging surface 8 moves away from the engaging portion 7. Due to this incompatibility of their movements, the engaging portion 7 and the engaging surface 8 (i.e. the ring nut 2) will jam thereby preventing the ring nut 2 from unscrewing.

Still further advantageously, the axis R is arranged (relative to the engaging surface 8) such that, when the ring nut 2 is in said advanced screwing area A, a screwing movement of the ring nut 2 will cause the counter element 6 to rotate such as to move the engaging portion 7 (in the screwing direction) away from the engaging surface 8 to allow further screwing of ring nut 2.

In accordance with the preferred embodiment, the guide means define a circle-section movement path of the engaging portion 7 intersecting the engaging surface 8 and in which, seen in the screwing circumferential direction of ring nut 2, the engaging portion 7 is arranged downstream of the rotational axis R.

This allows for the automatic disengagement of the engaging portion from the engaging surface upon screwing, as well as their mutual engagement and locking in case of unscrewing of ring nut 2.

Advantageously, the articulating portion 12 comprises a flexible joint.

This flexible joint advantageously contributes to permanently, elastically urge the counter element 6 towards a neutral position where the engaging portion 7 can automatically engage the engaging surface 8 of ring nut 2, when the latter enters the advanced screwing area A.

In accordance with the embodiment illustrated for example in FIG. 1, the counter element 6 comprises a lever having a first end forming said engaging portion 7 and a second end 13 connected to the connecting portion 14 of the device 1.

Advantageously, the counter element 6 and the connecting portion 14 are made as one piece, preferably from a synthetic material, for example PVC or polyethylene, to form a single body that is substantially plate-like and hence small-sized.

In the connection area of the counter element 6 with the connecting portion 14 there is formed a undercut 15 that locally reduces the cross-section of the counter element 6 such as to provide said flexible joint.

Advantageously, the engaging portion 7 comprises one or more pawls 20 or stop tabs suitable to engage the engaging surface of ring nut 2, which is also preferably toothed.

Alternatively, the engaging portion 7 and the engaging surface 8 can be either configured like a wedge or provided with sufficient roughness to provide effective coupling to each other, the engaging surface 8 being thereby capable of pulling the engaging portion 7 to said screwing and locking positions.

Figure 9:
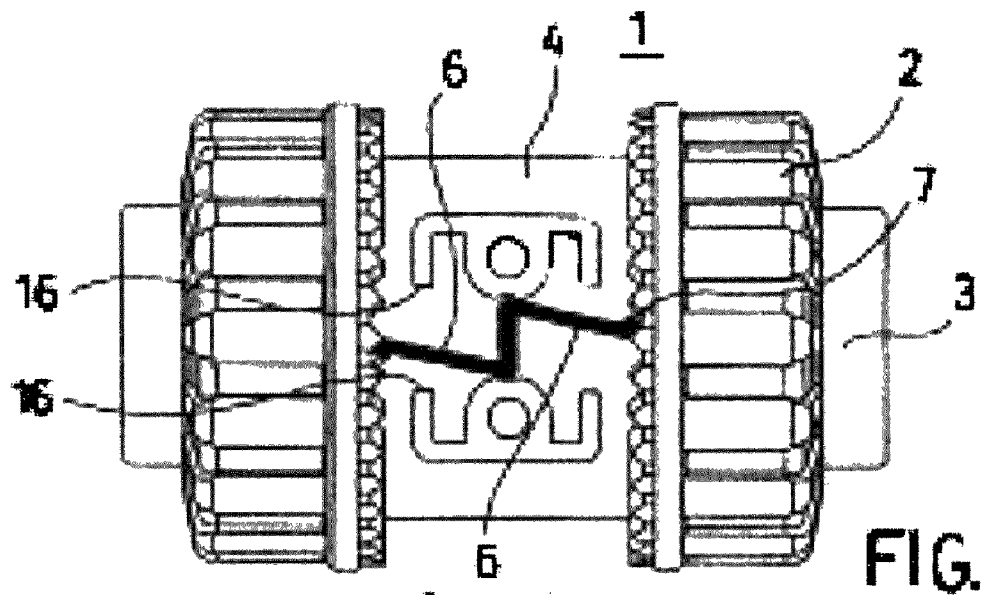
Figure 10:
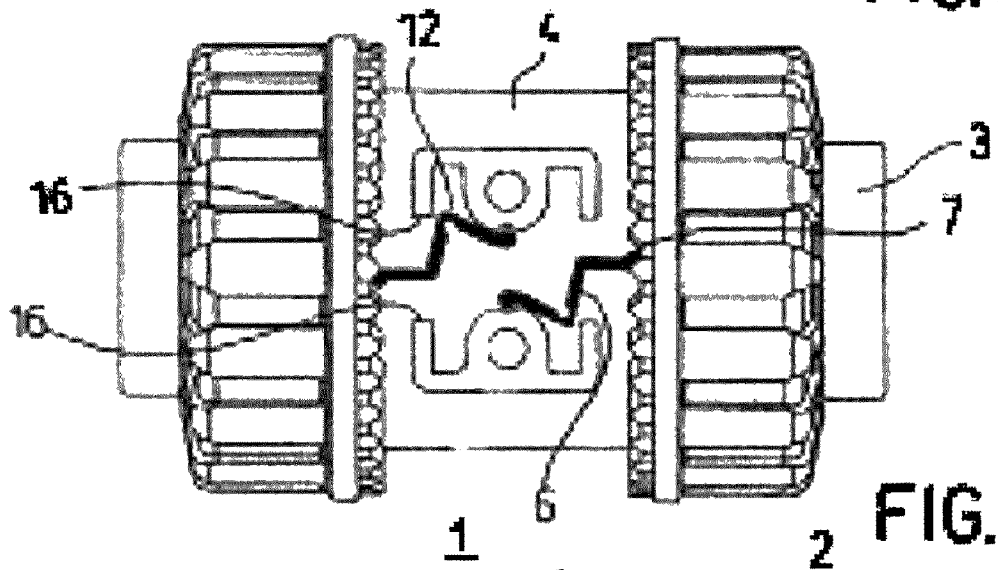
Figure 11:
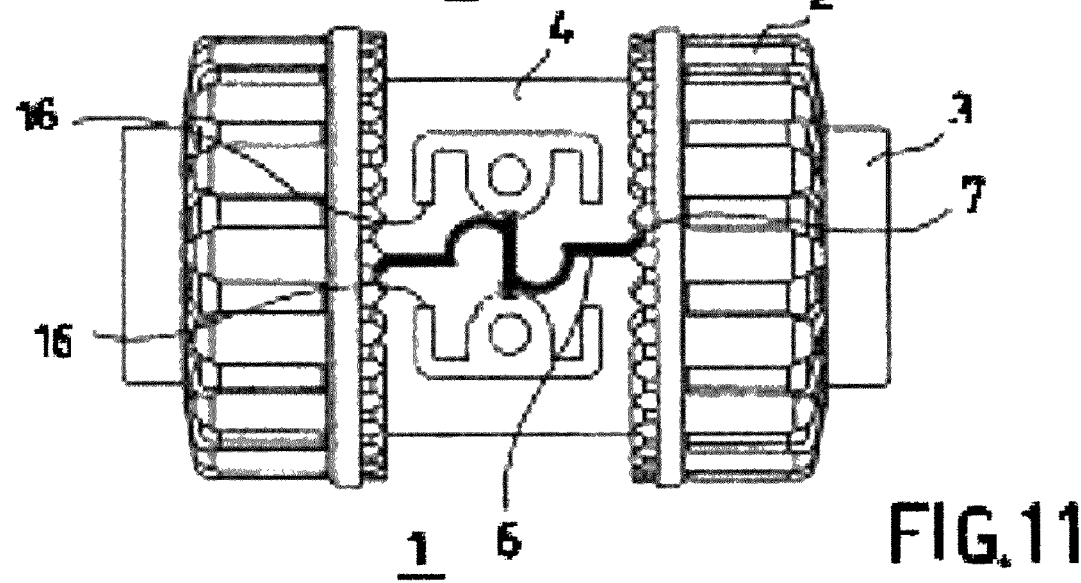

In accordance with another embodiment, such as shown in FIGS. 9 and 10, the guide means comprise at least one stop surface 16 suitable to be at least one end-of-stroke for the counter element 6 such as to dictate the desired movement path to the engaging portion 7.

In accordance with a further embodiment, the device 1 comprises means enabling to manually move the engaging portion 7, when the ring nut 2 is in the advanced screwing area A, such that the engaging portion 7 is disengaged from the engaging surface 8 to allow unscrewing the ring nut 2. Advantageously, these means comprise a manual operating portion 17 formed in the counter element 6. The manual operating portion allows the counter element 6 to be manually moved against an elastic force (produced by the flexible joint 12) urging the engaging portion 7 against the engaging surface 8.

Advantageously, the device 1 described so far comprises two or more counter elements 6, each of the two or more counter elements 6 being suitable to prevent unscrewing of one ring nut 2, respectively.

Figure 7:
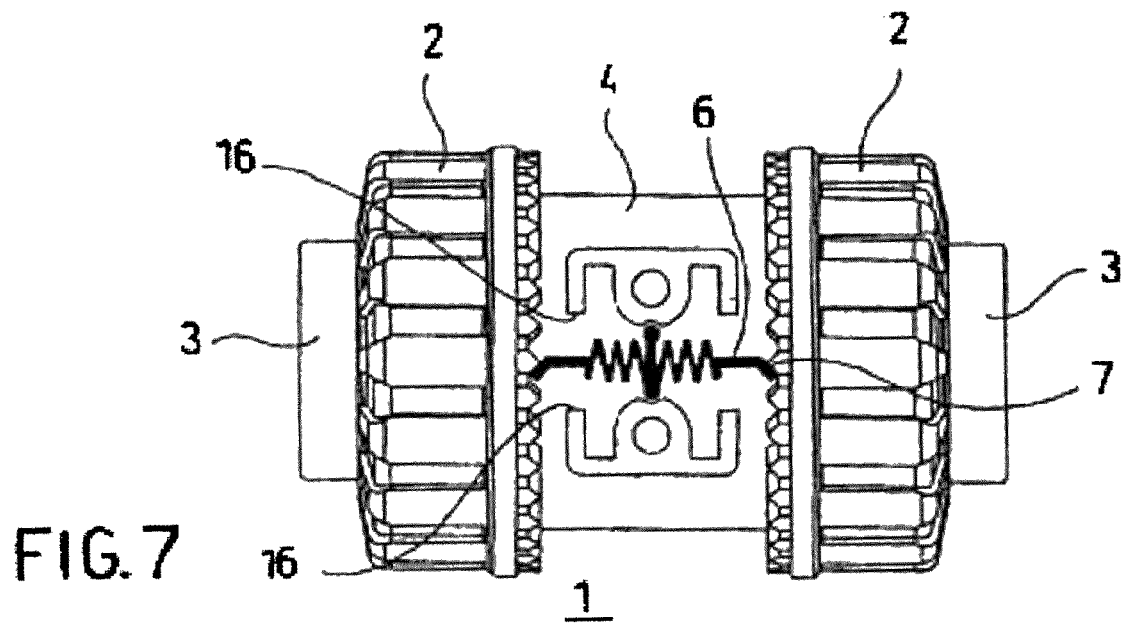
FIGS. 7 to 11 are side views of further embodiments of the device according to the invention.
Figure 8:
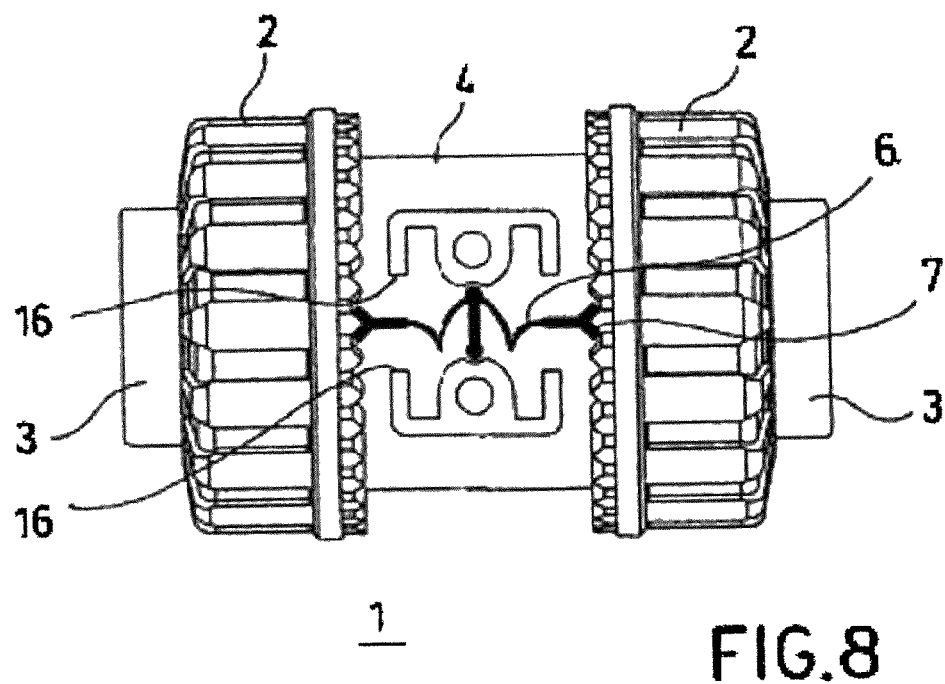

In accordance with the embodiments illustrated in the figures, there are provided two counter elements, opposed to each other, preferably formed such as to give either a symmetric shape (FIGS. 7 and 8) or a center-asymmetric shape (FIGS. 1, 9, 10, 11) to the device 1.

The threaded ring nut/s 2 comprise/s, as stated above, at least one engaging surface 8, preferably matching the engaging portion 7, i.e. the pawls 20 of the counter element 6. Particularly, the engaging surface is embodied by a ring gear 18, formed on a front surface of the tubular body of the ring nut 2 and facing the anti-unscrewing device 1. The ring gear 18 forms a continuous annular series of teeth or notches 19 suitable to engage the pawls 20 of the counter element 6 in any rotational position of the ring nut 2.

The inclination of the pawls 20 and notches 19, and their elastic engagement by means of the flexible joint 12 allow the snap-screwing of the ring nut 2 at least in the advanced screwing area A.

Both the valve 4 and the anti-unscrewing device 1 connected thereto are preferably obtained by means of injection moulding from a synthetic material, for example polypropylene or PVC. Alternatively, they can be made of a metallic material.

The operation of the anti-unscrewing device according to the invention will be described below.

The connection of a tube 3 to the threaded portion 5 of valve 4 is carried out as follows:

the tube with the ring nut associated therewith is aligned with and abutted against the threaded portion 5 and the ring nut 2 is screwed, either manually or using suitable tools, to said portion 5.

When entering the advanced screwing area A, the ring gear 18 engages the pawl of the engaging portion.

By further screwing the ring nut, the latter draws the engaging portion 7 in motion, thereby causing the counter element 6 to bend about the axis R being defined by the elastic joint 12 of the counter element 6. Consequently, the engaging portion 7 is in its screwing position, i.e. it is sufficiently away or disengaged from the engaging surface 8 to allow further screwing the ring nut 2.

Due to the toothed configuration of the engaging surface 8 and the elastic bending of the counter element 6 in the flexible joint 12, this further screwing of the ring nut takes place by a snap action.

After the ring nut 2 has been screwed, any undesired unscrewing movement of the same will cause the engaging portion 7 to be pulled in the opposite direction, and accordingly the counter element 6 will bend or rotate about the axis R such that the engaging portion 7 will move further against the engaging surface 8, which will jam against the counter element 6.

In the event that the tube or valve requires to be disassembled or replaced, the engaging portion 7 is manually disengaged from the engaging surface 8 by operating the manual operating portion 17 to allow unscrewing the ring nut 2.

The anti-unscrewing device according to the invention has a number of advantages. It allows for a quick and easy assembly without requiring skilled labour, and further it ensures reliable locking of the ring nut as well as a safe and durable connection between tubes and valves.

Particularly, the anti-unscrewing device according to the invention allows for the automatic locking of the ring nut in any rotational position and prevents the latter from becoming loosened also in the presence of vibrations and other mechanical stress.

It should be understood that variations and/or additions may be provided to what has been described and illustrated above, without departing from the scope of the invention.

In accordance with an embodiment, the anti-unscrewing device comprises means for affixing labels containing information concerning the valve, which are embodied for example by one or more tailpieces 21 of the plate 14, which are provided with holes 22 allowing to affix a label.

What is claimed is:

1. An anti-unscrewing device for preventing the unscrewing of a ring nut having an engaging surface, comprising:
   a. a connecting portion rotatably-fixed, and attached to a body portion, said connecting portion forming an articulating portion and a pawl;
   b. said articulating portion biasing said pawl into engagement with the engaging surface, wherein said articulating portion:
      i. allows the ring nut to be rotated in a first direction by positioning the pawl so that the engaging surface of the ring nut pushes the pawl out of engagement with the engaging surface when the ring nut is rotated in the first direction; and
      ii. prevents the ring nut from being rotated in a second direction by positioning the pawl so that the pawl engages the engaging surface of the ring nut when the ring nut is rotated in the second direction,
   wherein said connecting portion rotatably-fixed is configured to rotate about a first axis of rotation and the ring nut is configured to rotate about a second axis of rotation, wherein the first axis of rotation and second axis of rotation are substantially perpendicular to each other.

2. The anti-unscrewing device of claim 1, said connecting portion further comprising a counter element for receiving a force for disengaging the pawl from the engaging surface of the ring nut to allow rotation in the second direction.

3. The anti-unscrewing device of claim 1, wherein the body portion is a valve.

4. The anti-unscrewing device according to claim 1, wherein said articulating portion comprises an elastic flexural joint.

5. The anti-unscrewing device according to claim 1, wherein the pawl is permanently elastically affected such as to be positioned in a neutral position that allows the pawl to automatically engage the engaging surface when the ring nut enters an advanced screwing area.

6. The anti-unscrewing device according to claim 1, wherein the pawl and the connecting portion are formed as one piece.

7. The anti-unscrewing device according to claim 1, wherein in a connection area of the pawl with the connecting portion there is formed an undercut that locally reduces the cross-section of the connection area such as to provide a flexible joint.

8. The anti-unscrewing device according to claim 1, comprising means for manually displacing the pawl by disengaging the same from the engaging surface to allow unscrewing the ring nut.

9. The anti-unscrewing device according to claim 8, wherein said means comprise a manual operating portion formed at the pawl which allows to manually move the pawl against an elastic force that urges the pawl against the engaging surface.

10. The anti-unscrewing device according to claim 1, comprising at least one additional articulating portion and pawl, wherein each said at least one additional articulating portion and pawl is suitable to prevent the unscrewing of one ring nut.

11. The anti-unscrewing device according to claim 1, which is manufactured from a synthetic material by means of injection molding.

12. A fluid conveying or delivery system comprising at least one coupling tubular end and an anti-unscrewing device for ring nuts joining tubular ends of two components in fluid conveying or delivery systems, wherein a ring nut can be screwed to one of the tubular ends in order to join said ends, wherein said anti-unscrewing device comprises:
   a. a connecting portion rotatably-fixed, and attached to a body portion, said connecting portion forming an articulating portion and a pawl;
   b. said articulating portion biasing said pawl into engagement with an engaging surface, wherein said articulating portion:
      i. allows the ring nut to be rotated in a first direction by positioning the pawl so that the engaging surface of the ring nut pushes the pawl out of engagement with the engaging surface when the ring nut is rotated in the first direction; and
      ii. prevents the ring nut from being rotated in a second direction by positioning the pawl so that the pawl engages the engaging surface of the ring nut when the ring nut is rotated in the second direction, and
   wherein said connecting portion rotatably-fixed is configured to rotate about a first axis of rotation and the ring nut is configured to rotate about a second axis of rotation, wherein the first axis of rotation and second axis of rotation are substantially perpendicular to each other.

13. The system according to claim 12, wherein said system is a valve with two threaded coupling portions that are opposite to each other.

14. The system according to claim 12, comprising one or more threaded ring nuts that can be screwed to said at least one tubular end of the system, such that the latter can be connected to another system, wherein said ring nut comprises a ring gear providing said engaging surface.

15. The system according to claim 14, wherein the ring gear is formed on a front surface of the ring nut facing the anti-unscrewing device.

* * * * *